May 16, 1944.　　H. W. GILLARD ET AL　　2,348,806
SEWAGE SAMPLER
Filed May 5, 1941
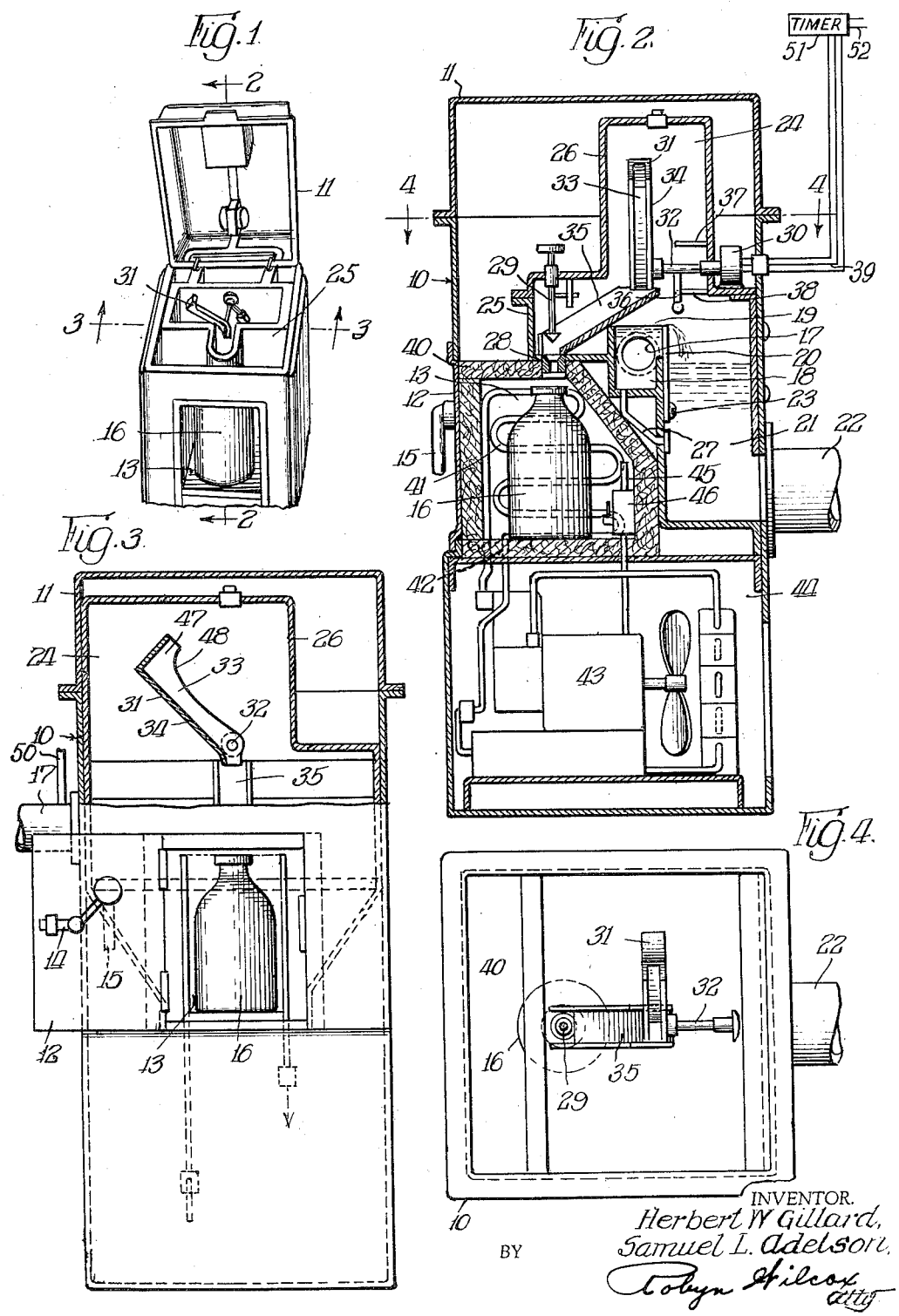
INVENTOR.
Herbert W Gillard,
Samuel L. Adelson,
BY Robyn Wilcox
ATTY Patented May 16, 1944

2,348,806

UNITED STATES PATENT OFFICE 2,348,806

SEWAGE SAMPLER

Herbert W. Gillard and Samuel L. Adelson, Chicago, Ill., assignors to Infilco Incorporated, a corporation of Delaware Application May 5, 1941, Serial No. 392,022

6 Claims. (Cl. 73—21)

This invention relates to sampling apparatus for liquids, particularly for sewage or sludge as treated in sewage disposal plants.

A primary object of the invention is to provide a sampler which secures and maintains a more representative sample than could be had with prior apparatus.

Another object is to provide a mechanical sampler which is less dependent on human supervision and service than prior samplers were.

A further object is to provide a sampler which will automatically take a plurality of samples and will maintain the samples under conditions which will avoid putrefaction or deterioration.

Another object is to provide a sampler adapted to prevent septic corruption of a sewage sample, progressive digestion of a sludge sample, or the like.

Still other objects may appear from the following description.

The sampling of sewage liquid is a typical instance of the application of the invention, and the apparatus herein mentioned will be particularly described as applied to that object, although other applications will suggest themselves to those skilled in the art.

Sewage plants ordinarily are quite spacious and are equipped with a number of large treatment tanks at considerable distances from one another. Samples must be collected from most of those tanks at frequent intervals; they must be carefully observed and analyzed; and the treatment must be controlled in accordance with the findings. For such analyses the samples of each sampling period must be brought from the numerous sampling points to a laboratory room in a central building.

Even though not actually septic upon arrival at the disposal plant the sewage soon tends to become septic. It is treated in the plant to counteract such septic tendencies in order that the river, brook or other ultimate recipient of the treated sewage may be protected from putrefactive materials and maintained in sanitary condition. Thus it is of the essence of sewage treatment to observe and control septic conditions of the sewage, and there is gradual reduction of septicity as the sewage flows through the several treatment tanks of a disposal plant. However, if a sample of sewage taken from such a tank be allowed to stand unguarded, or if it be stored over an excessive period, or polluted with septic material, or subjected to temperature conditions which favor septicity, then even the most aerobic or aseptic sewage sample may gradually turn septic. In such and similar events the sample fails to truly represent the condition of the sewage from which the sample was taken.

For such reasons strict procedures have been developed for the manual sampling of sewage, and painstaking efforts are made to obtain and maintain each sample in its original state. Such methods are reasonably reliable as far as they go, but they are expensive due to the amount of labor and time required. It is practically impossible in the manual system to collect samples often enough to ascertain the true or average condition of sewage at each sampling point. What is ascertained is, at the best, the true condition at the precise moment the sample was taken, and that may vary, and frequently does vary without notice. Manual methods are defective since it is impossible to enforce strict accuracy in the timing of sampling periods, as the operator must walk from one sampling place to another to take out the various samples of each period. It is difficult, if not impossible, to manually collect samples so as to offset irregularities and chance conditions in the amount of sewage flow of each sampling period. Therefore, mechanical samplers have been proposed. They are operative to prepare a composite sample of many small portions taken at different times, the object being to prepare a sample that shows a fair average of the varying conditions throughout the day. However, the mechanical samplers known to us fail to live up to the standards outlined with respect to safeguarding the composite sample from development of septic conditions and keeping it truly representative of the sewage undergoing treatment.

Briefly, our invention provides an apparatus and method for automatically taking a plurality of small samples from a flowing stream to prepare a composite sample, and maintaining it under refrigeration to prevent deterioration of such sample.

Our invention will be clearly understood on consideration of the following detailed description and of the drawing in which like reference characters designate like elements in the various figures.

Figure 1 is a perspective view, with the lower portion broken off, of a preferred embodiment of our invention.

Figure 2 is a sectional side view of the apparatus shown in Figure 1, taken along line 2—2 of Figure 1, with the lower portion attached.

Figure 3 is a front view, partly in section, of the apparatus shown in Figure 1, taken along line 3—3 of Figure 1.

Figure 4 is a plan view of the sampler with the top removed.

Our improved sampler comprises a housing 10 provided with a hinged lid 11 and a door 12, affording access to a sample compartment 13 within the housing 10. This door can be held in a closed position by a bolt 14 operated by an outside handle 15. The sample compartment 13 is of a suitable size to contain a sample container, such as a glass bottle 16 of a size sufficient to hold a composite sample.

Sewage to be sampled enters the apparatus continuously through an inlet pipe 17 which may be either the sewage discharge pipe, or a by-pass in the sewage discharge conduit for continuously by-passing a portion of the sewage effluent through the sampler. This inlet pipe 17 discharges into an open conduit or channel 18 within the sampler housing 10. The sewage entering through inlet 17 maintains a liquid level 19 in the channel 18 at a level determined by an adjustable weir 20. The sewage from the channel 18 overflows over the weir 20 into the outlet channel 21 and is drained therefrom by effluent pipe 22. The weir 20 may be vertically adjustable by set screws 23, so that the apparatus can be used under different head conditions. The size of the channel 18 is such that solid matter contained in the sewage will not be retained therein, but will be flushed out by the flow therethrough.

The channel 18 is preferably contained in an inner housing 24 formed by wall 25 and removable cover 26, whereby the sewage and the operating mechanism of the sampler is sealed from the outside atmosphere. Also I prefer to provide a drain 27, so that the channel 18 may be drained from time to time, or upon stoppage of operation of the sampler. The inner housing 24 communicates with the sample chamber 13, which underlies a portion of the inner compartment 24 by means of conduit 28, which may be closed by a hand operated valve 29. The inner chamber is relatively air tight when the valve 29 is closed, and may then be sterilized by any suitable sterilizing agents. In operation the valve 29 is withdrawn from the conduit 28, so that samples taken from the sewage may fall into the sample bottle 16 placed below the conduit.

It is preferred that the hood 26 of the inner compartment 24 form a substantially air tight connection with the wall 25 and that the valve 29 form an air tight closure of conduit 28. It is desirable, in equipment of this kind, that provision be made for the sterilization of that part of the apparatus coming in contact with the liquid. In our apparatus this can be done by a valve, not shown, in the influent 17, thereby stopping the flow of liquid through the apparatus but permitting the liquid inside to drain therefrom, as by drain 27 and effluent 22. Any suitable bactericide, such as steam, can be admitted to the inner compartment, as through line 50, entering the influent line 17, whereby the entire inner compartment 24 may be sterilized without removing the cover 26 or otherwise touching any part of the apparatus containing sewage. The valve 29 which is closed during sterilization, prevents the bactericide from coming into contact with the sample in the container 16, thereby avoiding any change in the condition of the sample contained therein.

In order to transfer representative sewage portions from the channel 18 to the sample bottle 16, we cause periodic, measured flows through the restricted, valved conduit 28. At suitable intervals determined by a timer 51, which may be connected to a meter, not shown, in the sewage influent line 17 or sewage effluent line 22, a small, reversible, electric motor 30 is caused to operate and to alternately raise and lower a sampling cup or ladle 31 rigidly affixed to shaft 32. The spoon or ladle 31 is so arranged with respect to the channel 18 that it will dip into the sewage in the channel 18 when shaft 32 is rotated downwardly, and upon elevation of the ladle 31 the sewage sample will flow down the gutter 33 in the handle 34, into fixed trough 35, and thence into the sample bottle 16. The reverse rotation of the ladle 31 can be secured by any suitable mechanical means familiar to any mechanic, but we prefer to use a reversible motor 30 and suitable limit switches operated by the rotation of the shaft 32. The timer 51 can be supplied with power through electric wires 52 and is connected with motor 30 through lines 39. At the proper period of operation the timer can actuate the motor so as to secure a complete cycle of picking up and discharging a sample of sewage. In Figure 2 is shown an arm 36, which contacts limit switches 37 and 38, connected to electric circuit 39, supplying the motor 30. Both methods are well known and need not be described. As the ladle 31 emerges from the sewage in the channel 18, it raises a predetermined amount of sewage therefrom. Upon continued return rotation of the ladle the sewage taken up in this manner flows from the ladle 31 down the gutter 33 in its handle and into a suitably arranged intercepting chute, or trough 35, which leads to the inlet 28 into the sample chamber 13. The sample container 16 is supported in this sample chamber so as to catch the sewage discharged through the inlet 28.

One of the features of our invention is the ladle which, regardless of the depth of the liquid in which it is submerged, always takes a sample of a predetermined quantity. The ladle 31 includes a grooved handle 34, which conducts liquid to the trough 35 when the ladle is revolved to the raised position. The side walls 47 of the ladle 31 and the handle 34, are curved, as at 48, in such a manner that any tangential plane to the curved walls will define equal volumes within the cup and handle. This design provides that, regardless of the depth of submergence into the channel 18 or other factors of sampling, a fixed quantity is always removed by the ladle.

A lining of heat insulating material 40 lines the sample chamber 13, closely fitting around the sample container 16. The restricted conduit 28 from the channel 18, of course, passes through this insulation. The door 12 of the sampler compartment is likewise lined with such insulating material, so that the sample chamber normally may be insulated from the outer atmosphere and from the sewage in inner compartment 24. The only normal temperature exchange will take place through the restricted conduit 28 and is thus insignificant and harmless. Cooling coils 41 are provided inside the insulated walls 40. The terminals of the cooling coils extend through the floor of the sample compartment 13, as at 42, so that a refrigerant may be suitably supplied to the coils and removed therefrom by a refrigerating mechanism 43, contained in a lower compartment 44 of sampler housing 10. A standard compressor type refrigerator is shown in the drawing, although it will be understood that any refrigerating apparatus could be used. A thermostatic temperature responsive device 45, in the sample compartment 13, controls an electric switch mechanism 46, which in turn controls the operation of the refrigerating unit 43. The switch mechanism 46 can be adjusted by well known means to cause the refrigerating unit 43 to maintain a predetermined temperature within the sampling compartment.

The insulation 40 also protects the sewage sample in the bottle 16 from freezing temperatures of the outer air during the cold season. The temperature of sewage ordinarily is well above the freezing point since the sewage liquid contains hot kitchen and bathroom wastes, and the coldest constituents thereof only approach the temperature of ice water. The sewers carrying this liquid to the disposal plant are under the ground and the liquid is kept in motion therein, as well as in the treatment tanks. The sewage received in the channel 18 and discharged in the bottle 16 is therefore likely to be warmer than the air during the winter months. However, sewage is stagnant in the sample bottle 16 and the contents of the bottle could freeze, seriously affecting the subsequent analysis thereof, if not protected from freezing temperatures. The small opening 28 allows no draft of outside air into the sample chamber 13 and the air space of the chamber around the sample bottle 16 is preferably small, so that the sewage received in the bottle will lose very little heat, and its own heat is normally sufficient to prevent freezing. A heater could be installed but ordinarily is not necessary.

During hot weather, the insulation 40 cooperates with the refrigerating apparatus 43 to keep the air of the sample chamber 13 chilled, thereby cooling the sewage bottle 16, therein and preventing putrefaction from developing in the sample. Every portion of sewage received from the ladle introduces some heat in the sample. Such heat as well as that derived from other sources is absorbed by the refrigeration system, through coils 41, and is in due course given off to the atmosphere through the refrigeration system 43. When enough of the heat introduced has been removed from the sample chamber the switch 46, operated by thermostat 45, breaks the circuit, not shown, to the refrigeration mechanism 43, thereby stopping its operation. When the temperature in the sample chamber rises again due to reception of another portion of warm sewage, or for any other reason, the thermostat 45 operates the switch 46 to reestablish the circuit, not shown, supplying the refrigerating mechanism 43, thereby starting its operation.

Thus, by means of our invention, one is able with very little supervision and service to leave sample bottles 16 in the samplers for many hours of the day and night. Small portions of sewage are regularly added thereto by the automatic mechanism. We, therefore, obtain composite samples which represent fair averages of the respective conditions of sewage at each respective sampling point, and we safely maintain the composite samples in the condition in which they are received, so that each sample when ultimately inspected and tested is truly indicative of the condition at, or the results of treatment applied prior to the respective sampling point.

Manifestly many modifications and variations of the invention hereinbefore set forth may be made by persons skilled in the art without departing from the spirit and scope thereof. Accordingly, the appended claims are to be given an interpretation commensurate with the novelty herein described and as broad as may be permitted by the prior art.

We claim:

1. A sewage sampler comprising a housing, a wall dividing the space within said housing into a first and second chamber, a normally open passageway through said wall and providing communication between said chambers, sewage sampling means associated with said first chamber, said means comprising a sewage flow channel in said first chamber, a sewage inlet to said channel, a sewage outlet from said channel, a sampling member movable across said channel, a prime mover operatively joined to said movable member, control means governing operation of said prime mover, a conduit receiving sewage from said movable member, said conduit leading to said passageway, closure means for said passageway whereby said chambers may be isolated from each other, a steam conduit joined to said first chamber, thermal insulating means separating said chambers and surrounding said second chamber, a door in a wall of said second chamber, and a refrigerating means in said second chamber.

2. The apparatus of claim 1 wherein the control means is operated by the flow of a predetermined quantity of liquid through said sampler.

3. A sampler device comprising a cabinet, a heat insulated compartment within said cabinet, a flow passage discharging into the upper portion of said compartment from the interior of said cabinet outside of said compartment, a valve operable to close said flow passage, a flow channel in said cabinet outside of said compartment, an inlet into said flow channel, an outlet from said flow channel, sampling means in said cabinet outside said compartment comprising a shaft, a ladle including a cup portion and a handle mounted on said shaft, said handle being in the form of a conduit leading from said cup portion and discharging into said flow passage, a prime mover operatively connected to said shaft to rotate the same, a governor controlling the frequency of operation of the prime mover, refrigerating coils within said insulated compartment, means for supplying said coils with refrigerant, and a thermostat controlling the supply of said refrigerant to said refrigerating unit.

4. In combination in a liquid sampler, a ladle member swingable about a horizontal axis, a conduit associated with the handle of such ladle for conducting liquid therefrom, said ladle being provided with side walls forming a vertical concave curve to which all tangential lines will define equal volumes within the ladle and handle conduit, and means associated with said handle for periodically lowering said ladle into liquid being sampled and then raising the same above the liquid.

5. An automatic sewage sampler comprising a housing, an open channel for the flow of sewage in said housing, a ladle member within said housing swingable about a horizontal axis and in spaced relationship to said channel, the handle of said ladle being provided with a groove for conducting liquid from said ladle toward its axis, and said ladle being provided with side walls forming a vertical concave curve to which all tangential lines will define equal volumes within the ladle and handle groove, means for periodically revolving said ladle into sewage in said channel and then raising the same above said sewage including a prime mover operatively connected to said handle and a governor controlling the frequency of operation of said prime mover, an insulated compartment adapted to hold a sample container adjacent said housing, refrigeration means for maintaining a predetermined temperature within said compartment, a conduit for conducting liquid from said ladle into the upper portion of said compartment, and a substantially air tight valve for said conduit.

6. The apparatus of claim 5 wherein the means for periodically revolving said ladle is operated by the flow of a predetermined quantity of sewage.

HERBERT W. GILLARD.
SAMUEL L. ADELSON.